United States Patent Office 2,917,345
Patented Dec. 15, 1959

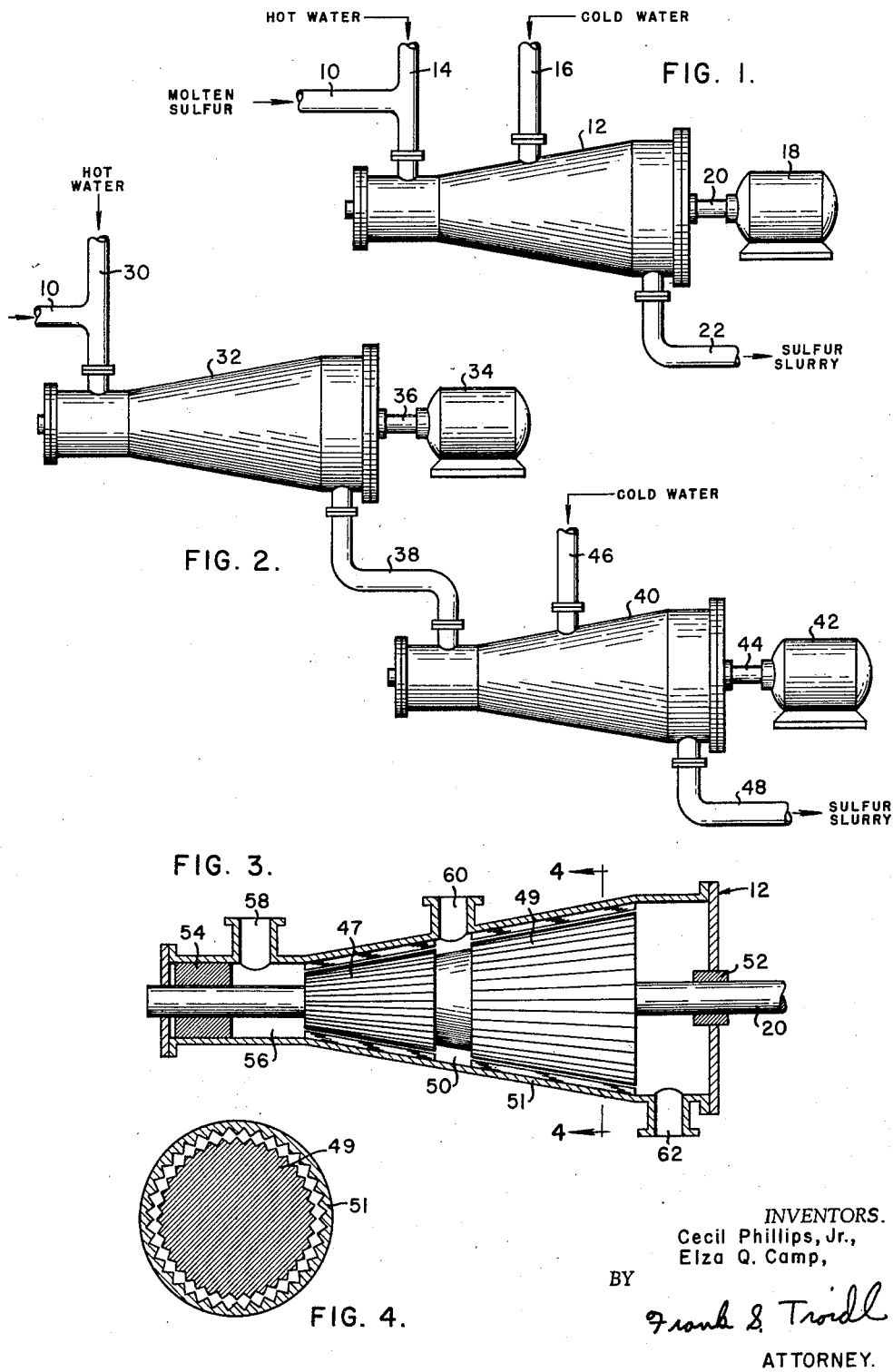

2,917,345

PROCESS OF PRODUCING SULFUR SLURRY FOR TRANSPORTATION THEREOF

Cecil Phillips, Jr., and Elza Q. Camp, Baytown, Tex., assignors to Humble Oil & Refining Company Application August 26, 1957, Serial No. 680,356

4 Claims. (Cl. 302—66)

This invention relates to a process for producing a slurry of sulphur in a liquid. More particularly, the invention relates to a process for taking molten sulphur and forming a slurry of solid sulphur particles in water.

One method of preparing sulphur in useable form is to solidify the sulpur, which is usually produced by means of a process known as the Frasch process. In the Frasch process, the sulphur is produced in molten form. The molten sulphur is then solidified. The solidified sulphur in dry form is then ground into smaller pieces and transported by pipeline.

Large sulphur deposits have been discovered in Gulf Coast waters off the coast of Louisiana and Texas. The problem presented is that of obtaining the sulphur from the deposits and transporting the sulphur from the offshore location to onshore locations many miles from the offshore location. The production of sulphur slurry by solidifying the molten sulphur and then grinding the sulphur in dry form for pipeline transportation to onshore locations has many disadvantages, including the following:

(1) The equipment required is large and not very adaptable to operation on an offshore platform.

(2) Operating efficiency is small.

(3) A great deal of mechanical equipment is necessary which requires maintenance.

(4) The dry grinding of sulphur produces sulphur dust, resulting in fire and explosion hazards.

To overcome the above-mentioned disadvantages, it has been proposed to mix the molten sulphur produced by the Frasch process with cold water in a disperser or grinding machine to produce a sulphur-water slurry. However, one feature of this procedure that seriously interferes with its practical application is that the molten sulphur freezes in the conduit at the point where the molten sulphur first contacts the cold water and in the disperser near the sulphur inlet. The conduit and disperser then become plugged with solid sulphur.

It is highly desirable that a process for the production of a sulphur-water slurry from molten sulphur be presented to the art which does not suffer from the disadvantage of having the sulphur solidify in the conduit at the point where the molten sulphur contacts the water and in the disperser near the sulphur inlet.

Our new process provides a continuous supply of sulphur-water slurry from a continuous supply of molten sulphur produced from the sulphur deposits. The slurry is then pumped from the offshore location to land areas.

Briefly described, our new process consists in mixing the sulphur in molten form with a liquid which is kept at a temperature above the melting point of the sulphur. A dispersion of liquid droplets of the sulphur is formed in the hot liquid. At a later point in the flow stream, a liquid, which is kept at a temperature below the melting point of the sulphur, is added to the dispersion to solidify the sulphur, thus producing the desired sulphur-water slurry.

The point at which the warm liquid and molten sulphur are mixed is not clogged because the mixture is kept at a temperature above the melting point of the sulphur. The system is not clogged at the point where the cold liquid is added to the dispersion because the sulphur is in the form of warm liquid droplets which solidify to a slurry of solid material in the liquid when the cold liquid is added.

Referring to the drawing:

Fig. 1 is a schematic view showing one system for carrying out our process;

Fig. 2 is a schematic view showing an alternative system for carrying out our process;

Fig. 3 is an elevational view partially in section showing one kind of disperser included in the systems of Fig. 1 and Fig. 2; and Fig. 4 is a sectional view taken along line 4—4 of Fig. 3.

Referring to Fig. 1, a conduit 10 is used for conducting the molten sulphur to a disperser 12. A second conduit 14 conducts hot water to the disperser 12. The hot water flowing through conduit 14 is flowed under pressure and kept at a temperature above the melting point of the sulphur. This temperature is above 246° F., the melting point of sulphur. A pressure of about 28 p.s.i.a. or above, is sufficient to prevent evaporation of the water at a temperature of 246° F.

The molten sulphur and hot water are mixed in the lower portion of pipe 14 and fed to the disperser 12 as a mixture of liquid droplets of the sulphur in hot water.

A conduit 16 also leads to the disperser 12. Conduit 16 is located so that liquids flowed through conduit 16 are combined in the disperser 12 with the dispersion of liquid sulphur droplets in the liquid. A liquid having a temperature below the melting point of sulphur, such as cold water, is conducted through pipe 16 to the disperser 12 where it is mixed with the dispersion of sulphur droplets in the hot water to solidify the sulphur droplets and form a slurry of small sulphur particles in water.

The disperser 12 may be a wet grinding disperser which includes means for grinding the sulphur droplets and sulphur particles to produce a slurry of sulphur particles of a desired size. The grinding means is operated by a motor 18 and motor operated shaft 20.

The slurry is conducted through pipe 22 to a pump mechanism (not shown) for pumping through a pipeline to a desired location.

Fig. 2 is a schematic diagram showing two dispersers instead of one, as shown in Fig. 1, with the cold water being added to the flow stream at the second disperser. The molten sulphur and hot water are mixed in the lower portion of pipe 30 to provide a mixture of liquid sulphur droplets in water to disperser 32 operated by motor 34 and shaft 36. The dispersion of liquid sulphur droplets in water is conducted through conduit 38 to a second disperser 40. Disperser 40 is operated by motor 42 and shaft 44. A cold water conduit 46 leads into disperser 40 at a point such that the cold water is mixed with the dispersion fed through conduit 38 to solidify the liquid sulphur droplets and form the desired slurry. The slurry is conducted through conduit 48 to the pump mechanism (not shown) for pumping the slurry to the desired location.

A typical wet grinding disperser useful in carrying out our new process is shown in Fig. 3. This figure shows the internal mechanism of disperser 12 of Fig. 1 and disperser 40 of Fig. 2. The disperser 32 of Fig. 2 is similar to disperser 12 of Fig. 1 and disperser 40 of Fig. 2 except that one of the liquid inlets is omitted. The disperser 12 includes a pair of frustral-conical serrated rotors, 47 and 49, separated by an annular mixing chamber 50. The serrated rotors are rotated by means of the shaft 20 connected to a motor. Shaft 20 is mounted in bearings 52 and 54. Bearings 52 and 54 also function as seals to prevent the leakage of the liquids from the disperser. The portion of the housing 51 of the disperser adjacent the serrated rotors is also serrated. Hence, a variable clearance exists between the serrated rotors and the serrated stators of housing 51. The mixture of sulphur droplets in water which is fed to chamber 56 through inlet 58 is partially ground by the serrated rotor 47. The cold water added through inlet 60 mixes with the dispersion in chamber 50 to solidify the liquid sulphur droplets producing the slurry. The solid sulphur particles in the slurry are further ground by the serrated rotor 49 and fed out of the disperser 12 through outlet 62.

The size of the sulphur particles desired depends, among other things, on the distance over which the slurry is to be transported by pipeline and the proportion of water to sulphur. The particle size may be varied over a wide range either by changing the design and/or clearance of the rotor and stator in the disperser, thus permitting the production of a slurry having optimum particle size for pipeline transportation.

It is apparent that various modifications of our new process may be made without departing from the scope of the language of the appended claims. The claimed process may be used for producing slurries of materials other than sulphur.

We claim:

1. A continuous flow process for taking molten sulphur from the ground by the Frasch process, preparing a slurry of sulphur particles in water, and transporting the slurry to a distant location comprising: conducting the molten sulphur to the surface; mixing the molten sulphur with hot water kept under pressure and at a temperature above the melting point of sulphur to prevent solidification of the molten sulphur at the point of contact with the water and produce a dispersion of liquid sulphur droplets in hot water; then adding cold water to the dispersion to solidify the liquid sulphur droplets to produce a slurry of sulphur particles in water; and conducting the slurry to said distant location.

2. A continuous flow process for taking molten sulphur from the ground by the Frasch process, preparing a slurry of sulphur particles in water, and transporting the slurry to a distant location comprising: conducting the molten sulphur from the ground through one line and hot water under pressure and at a temperature above the melting point of sulphur through another line to a disperser to produce a dispersion of liquid sulphur droplets in hot water, the water being kept at said temperature to prevent solidification of the molten sulphur at the point of contact with the water; then flowing the dispersion through one line and cold water through another line to a second disperser, thereby producing a slurry of solid sulphur particles in water; and conducting the slurry to said distant location.

3. A continuous flow process for taking molten sulphur from the ground by the Frasch process, preparing a slurry of sulphur particles in water, and transporting the slurry to a distant location comprising: conducting the molten sulphur from the ground through one line and hot water under pressure and at a temperature above the melting point of sulphur through another line to produce in a portion of a disperser a dispersion of liquid sulphur in hot water, the water being kept at said temperature to prevent solidification of the molten sulphur when it contacts the water; adding cold water to said disperser through a separate inlet to mix with the dispersion and solidify the liquid sulphur droplets to produce a slurry of sulphur particles in water; and conducting the slurry to said distant location.

4. A continuous flow process for taking molten sulphur from the ground at an offshore location by the Frasch process, preparing a slurry of sulphur particles in sea water, and transporting the slurry to an onshore location comprising: continuously mixing the molten sulphur produced at the offshore location with hot sea water kept under pressure and at a temperature above the melting point of sulphur to prevent solidification of the molten sulphur at the point of contact with the hot sea water and produce a dispersion of liquid sulphur droplets in hot water; thereafter adding cold sea water to the dispersion to produce a slurry of solid sulphur particles in sea water; and pumping the slurry to the onshore location.

References Cited in the file of this patent

UNITED STATES PATENTS

| 1,969,242 | Szegvari | Aug. 7, 1934 |
| 2,064,728 | Calcott et al. | Dec. 15, 1936 |
| 2,280,703 | Hart | Apr. 21, 1942 |
| 2,537,842 | McGauley | Jan. 9, 1951 |
| 2,691,800 | Seavey | Oct. 19, 1954 |
| 2,798,772 | Redcay | July 9, 1957 |
| 2,844,541 | Work | July 22, 1958 |

OTHER REFERENCES

Chem. Engin. News, vol. 58, No. 3, pages 128 and 183, March 1951.